United States Patent
Casas et al.

(10) Patent No.: US 11,794,785 B2
(45) Date of Patent: Oct. 24, 2023

(54) MULTI-TASK MACHINE-LEARNED MODELS FOR OBJECT INTENTION DETERMINATION IN AUTONOMOUS DRIVING

(71) Applicant: UATC, LLC, Mountain View, CA (US)

(72) Inventors: Sergio Casas, Toronto (CA); Wenjie Luo, Toronto (CA); Raquel Urtasun, Toronto (CA)

(73) Assignee: UATC, LLC, Mountain View, CA (US)

(*) Notice: Subject to any disclaimer, the term of this patent is extended or adjusted under 35 U.S.C. 154(b) by 0 days.

(21) Appl. No.: 17/749,841

(22) Filed: May 20, 2022

(65) Prior Publication Data

US 2022/0289180 A1    Sep. 15, 2022

Related U.S. Application Data

(63) Continuation of application No. 16/420,686, filed on May 23, 2019, now Pat. No. 11,370,423.
(Continued)

(51) Int. Cl.
*B60W 60/00* (2020.01)
*B60W 30/095* (2012.01)
(Continued)

(52) U.S. Cl.
CPC .... *B60W 60/0027* (2020.02); *B60W 30/0956* (2013.01); *G05D 1/0221* (2013.01);
(Continued)

(58) Field of Classification Search
CPC ......... B60W 60/0027; B60W 30/0956; B60W 2552/00; B60W 2554/402; G05D 1/0221;
(Continued)

(56) References Cited

U.S. PATENT DOCUMENTS 10,310,087 B2   6/2019   Laddha et al.
10,809,361 B2   10/2020  Vallespi-Gonzalez et al.
(Continued)

OTHER PUBLICATIONS

Ballan et al., "Knowledge transfer for scene-specific motion prediction", European Conference on Computer Vision, 2016, pp. 697-713.
(Continued)

*Primary Examiner* — Michael J Zanelli
(74) *Attorney, Agent, or Firm* — Dority & Manning, P.A.

(57) ABSTRACT

Generally, the disclosed systems and methods utilize multi-task machine-learned models for object intention determination in autonomous driving applications. For example, a computing system can receive sensor data obtained relative to an autonomous vehicle and map data associated with a surrounding geographic environment of the autonomous vehicle. The sensor data and map data can be provided as input to a machine-learned intent model. The computing system can receive a jointly determined prediction from the machine-learned intent model for multiple outputs including at least one detection output indicative of one or more objects detected within the surrounding environment of the autonomous vehicle, a first corresponding forecasting output descriptive of a trajectory indicative of an expected path of the one or more objects towards a goal location, and/or a second corresponding forecasting output descriptive of a discrete behavior intention determined from a predefined group of possible behavior intentions.

20 Claims, 10 Drawing Sheets

Related U.S. Application Data

(60) Provisional application No. 62/748,057, filed on Oct. 19, 2018, provisional application No. 62/685,708, filed on Jun. 15, 2018.

(51) Int. Cl.

| | |
|---|---|
| *G05D 1/02* | (2020.01) |
| *G06N 20/00* | (2019.01) |
| *G06V 20/58* | (2022.01) |
| *G06V 10/764* | (2022.01) |
| *G06V 10/82* | (2022.01) |
| *G06V 40/20* | (2022.01) |

(52) U.S. Cl.
CPC ........... *G05D 1/0274* (2013.01); *G06N 20/00* (2019.01); *G06V 10/764* (2022.01); *G06V 10/82* (2022.01); *G06V 20/58* (2022.01); *G06V 40/20* (2022.01); *G05D 2201/0213* (2013.01)

(58) Field of Classification Search
CPC ......... G05D 1/0274; G05D 2201/0213; G06N 20/00; G06N 3/045; G06N 3/044; G06N 3/084; G06V 10/764; G06V 10/82; G06V 20/58; G06V 40/20
See application file for complete search history.

(56) References Cited

U.S. PATENT DOCUMENTS

| | | | |
|---|---|---|---|
| 2019/0025841 A1 | 1/2019 | Haynes et al. | |
| 2019/0147610 A1* | 5/2019 | Frossard | G06T 7/90 |
| | | | 382/103 |
| 2019/0302767 A1 | 10/2019 | Sapp et al. | |
| 2019/0367020 A1* | 12/2019 | Yan | G05D 1/027 |

OTHER PUBLICATIONS

Chen et al., "Multi-view 3d object detection network for autonomous driving", 2017 IEEE Conference on Computer Vision and Pattern Recognition, 2017, p. 3.
Dai et al., "R-fcn: Object detection via region-based fully convolutional networks", Advances in Neutral Information Processing Systems, 2016, pp. 379-387.
Engelcke et al., "Vote3deep: Fast object detection in 3d point clouds using efficient convolutional neural networks", 2017 IEEE International Conference on Robotics and Automation (IRCA), 2017, pp. 1355-1361.
Fathi et al., "Learning to recognize daily actions using gaze", European Conference on Computer Vision, 2012, pp. 314-327.
Geiger et al., "Vision meets robotics: the KITTI dataset", The International Journal of Robotics Research, 2013, pp. 1231-1237.
Girshick et al., "Rich feature hierarchies for accurate object detection and semantic segmentation", Proceedings of the IEEE Conference on Computer Vision and Pattern Recognition, 2014, pp. 580-587.
He et al., "Deep residual learning for image recognition", Proceedings of the IEEE Conference on Computer Vision and Pattern Recognition, 2016, pp. 770-778.
Hoermann et al., "Dynamic occupancy grid prediction for urban autonomous driving: a deep learning approach with fully automatic labeling", 2018 IEEE International Conference on Robotics and Automation (IRCA), 2017, pp. 2056-2063.
Howard et al., "Mobilenets: Efficient convolutional neural networks for mobile vision applications", arXiv preprint arXiv: 1704.04861, 2017.
Hu et al., "Probabilistic prediction of vehicle semantic intention and motion", 2018 IEEE Intelligent Vehicles Symposium (IV), 2018, pp. 307-313.

Iandola et al., "Squeezenet: Alexnet-level accuracy with 50x fewer parameters and <0.5 mb model size", arXiv preprint arXiv: 1602.07360, 2017.
Jain et al., "Car that knows before you do: Anticipating maneuvers via learning temporal driving models", Proceedings of the IEEE International Conference on Computer Vision, 2015, pp. 3182-3190.
Kim et al., "Prediction of drivers intention of lane change by augmenting sensor information using machine learning techniques", Sensors, 2017.
Kingma et al., "Adam: a method for stochastic optimization", Machine Learning, 2014.
Lee et al., "Desire: Distant future prediction in dynamic scenes with interacting agents", 2017 IEEE Conference on Computer Vision and Pattern Recognition (CVPR), 2017, pp. 2165-2174.
Lewis et al., "Sensor fusion weighting measures in audio-visual speech recognition", Proceedings of the $27^{th}$ Australasian Conference on Computer Science, 2004, pp. 305-304.
Li et al., "Vehicle detection from 3d lidar using fully convolutional network", arXiv prepring arXiv: 1608.07916, 2016.
Lin et al., "Focal loss for dense object detection", 2017 IEEE International Conference on Computer Vision (ICCV), 2017, pp. 2999-3007.
Liu et al., "Ssd: Single shot multibox detector", European Conference on Computer Vision, 2016, pp. 21-37.
Luo et al., "Fast and furious: Real time end-to-end 3d detection, tracking and motion forecasting with a single convolutional net", The IEEE Conference on Computer Vision and Pattern Recognition (CVPR), 2018, pp. 3569-3577.
Luo et al., "Understanding the effective receptive field in deep convolutional neural networks", Advances in Neural Information Processing Systems, 2016, pp. 4898-4906.
Ma et al., "Forecasting interactive dynamics of pedestrians with fictitious play", 2017 IEEE Conference on Computer Vision and Pattern Recognition (CVPR), 2017, pp. 4643-4644.
Park et al., "Egocentric future localization", Proceedings of the IEEE Conference on Computer Vision and Pattern Recognition, 2016, pp. 4697-4705.
Phillips et al., "Generalizable intention prediction of human drivers at intersections", Intelligent Vehicles Symposium (IV), 2017, pp. 1665-1670.
Qi et al., "Pointnet: Deep learning on point sets for 3d classification and segmentation", Proceedings of the IEEE Conference on Computer Vision and Pattern Recognition, 2017, pp. 652-660.
Redmon et al., "You only look once: Unified, real-time object detection", Proceedings of the IEE Conference on Computer Vision and Pattern Recognition, 2016, pp. 779-788.
Ren et al., "Faster r-cnn: Towards real-time object detection with region proposal networks", Advances in Neural Information Processing Systems, 2015, pp. 91-99.
Simon et al., "Complex-yolo: Real-time 3d object detection on point clouds", European Conference on Computer Vision, 2018, pp. 197-209.
Snoek et al., "Early versus late fusion in semantic video analysis", Proceedings of the $13^{th}$ Annual ACM International Conference on Multimedia, 2005, pp. 399-402.
Streubel et al., "Prediction of driver intended path at intersections", Intelligent Vehicles Symposium (IV), 2014, pp. 134-139.
Sutton et al., *Reinforcement learning: an introduction*, 1998.
Tran et al., "Learning spatiotemporal features with 3d convolutional networks", 2015 IEEE International Conference on Computer Vision (ICCV), 2015, pp. 4489-4497.
Yang et al., "Pixor: Real-time 3d object detection from point clouds", The IEEE Conference on Computer Vision and Pattern Recognition (CVPR), 2018, pp. 7652-7660.
Zhang et al., "Sensor fusion for semantic segmentation of urban scenes", 2015 IEEE International Conference on Robotics and Automation (ICRA), 2015, pp. 1850-1857.

* cited by examiner

MULTI-TASK MACHINE-LEARNED MODELS FOR OBJECT INTENTION DETERMINATION IN AUTONOMOUS DRIVING

CROSS-REFERENCE TO RELATED APPLICATIONS

The present application is a continuation of U.S. application Ser. No. 16/420,686 having a filing date of May 23, 2019, which is based on and claims benefit of U.S. Provisional Application 62/685,708 having a filing date of Jun. 15, 2018 and U.S. Provisional Application 62/748,057 filed on Oct. 19, 2018. Applicant claims priority to and the benefit of each of such applications and incorporates all such applications herein by reference in their entirety.

FIELD

The present disclosure relates generally to autonomous vehicles. More particularly, the present disclosure relates to autonomous vehicles that utilize multi-task machine-learned models for object intention determination.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system that includes one or more processors, a machine-learned intent model, and one or more non-transitory computer-readable media that store instructions that, when executed by the one or more processors, cause the computing system to perform operations. The machine-learned intent model is configured to function as a perception system to detect and track objects near an autonomous vehicle in a single forward pass through the machine-learned intent model. The operations include obtaining sensor data generated by one or more sensors configured to generate the sensor data relative to an autonomous vehicle. The operations also include obtaining map data associated with a surrounding geographic environment of the autonomous vehicle. The operations also include providing, as input to the machine-learned intent model, the sensor data and the map data. The operations also include receiving, in response to providing the sensor data and the map data as input to the machine-learned intent model, a jointly determined prediction from the machine-learned intent model for multiple outputs. The multiple outputs include at least one detection output indicative of zero or more objects detected within the surrounding environment of the autonomous vehicle. The multiple outputs also include a first forecasting output descriptive of a trajectory indicative of an expected path of the zero or more objects towards a goal location. The multiple outputs also include a second forecasting output descriptive of a discrete behavior intention determined from a predefined group of possible behavior intentions for the zero or more objects.

Another example aspect of the present disclosure is directed to an autonomous vehicle. The autonomous vehicle includes one or more sensors that generate sensor data relative to the autonomous vehicle. The autonomous vehicle also includes one or more processors. The autonomous vehicle also includes a machine-learned convolutional neural network comprising a plurality of shared layers that determine features used to jointly determine multiple outputs of the machine-learned convolutional neural network. The autonomous vehicle also includes one or more non-transitory computer-readable media that store instructions that, when executed by the one or more processors, cause the autonomous vehicle to perform operations. The operations include obtaining the sensor data generated by the one or more sensors. The operations include obtaining map data associated with a surrounding geographic environment of the autonomous vehicle. The operations also include providing, as input to the machine-learned convolutional neural network, the sensor data and the map data. The operations also include receiving, in response to providing the sensor data and map data as input to the machine-learned convolutional neural network, a jointly determined prediction from the machine-learned convolutional neural network for multiple outputs. The multiple outputs include at least one detection output indicative of zero or more objects detected within the surrounding environment of the autonomous vehicle, a trajectory output associated with each object, and an intent output associated with each object.

Another example aspect of the present disclosure is directed to a computer-implemented method. The method includes receiving, by a computing system comprising one or more computing devices, sensor data from one or more sensors configured to generate the sensor data relative to an autonomous vehicle. The method also includes receiving, by the computing system, map data associated with a surrounding geographic environment of the autonomous vehicle. The method also includes providing, by the computing system, as input to a machine-learned intent model, the sensor data and the map data. The method also includes receiving, by the computing system, in response to providing the sensor data and map data as input to the machine-learned intent model, a jointly determined prediction from the machine-learned intent model for multiple outputs comprising at least one detection output indicative of zero or more objects detected within the surrounding environment of the autonomous vehicle, a first corresponding forecasting output descriptive of a trajectory indicative of an expected path of the zero or more objects towards a goal location, and a second corresponding forecasting output descriptive of a discrete behavior intention determined from a predefined group of possible behavior intentions.

Other aspects of the present disclosure are directed to various systems, apparatuses, non-transitory computer-readable media, user interfaces, and electronic devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
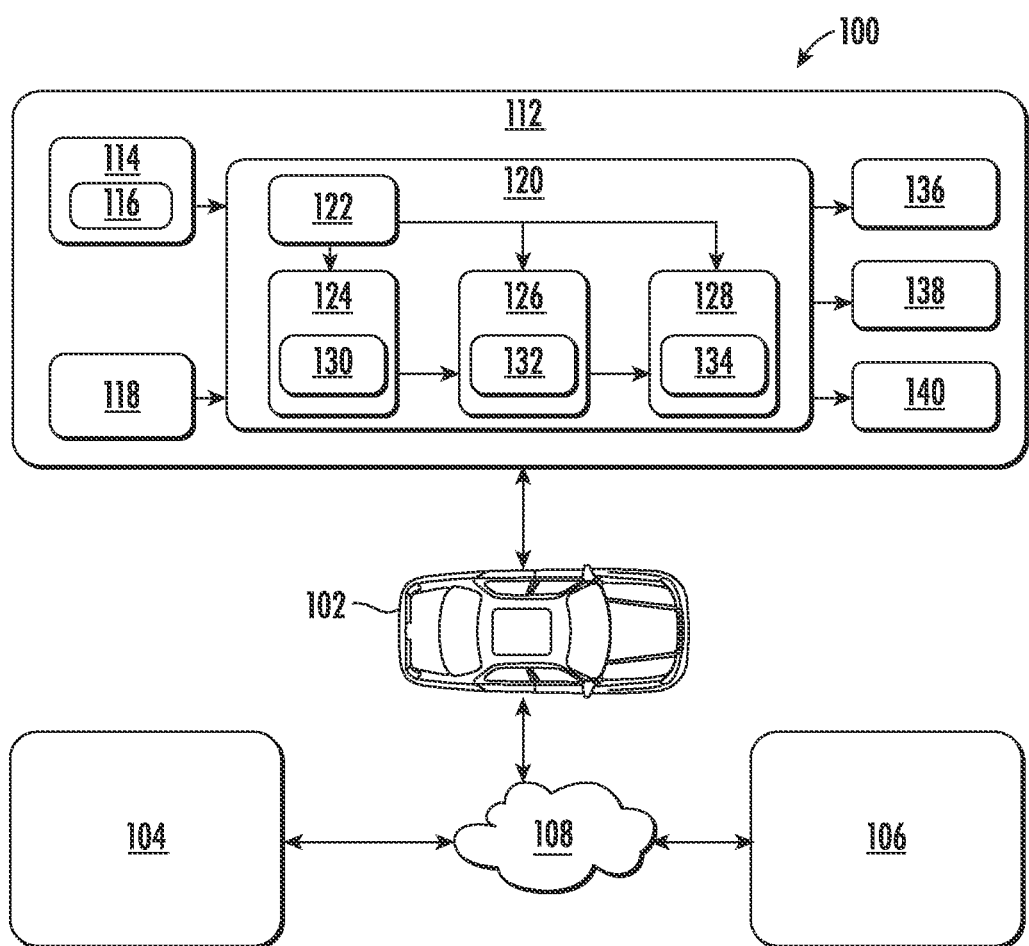
FIG. 1 depicts a block diagram of an example system for controlling the navigation of a vehicle according to example embodiments of the present disclosure.

Generally, the present disclosure is directed to systems and methods that apply machine-learned models to detect objects and forecast their behavior in an improved manner. More particularly, a multi-task machine-learned intent model can be trained to receive sensor data and map data and jointly implement object detection and forecasting in a single forward pass through the intent model. Object intent in the form of detection and forecasting can include a combination of discrete high-level behaviors associated with detected objects as well as continuous trajectories into the future. Such a multi-task machine-learned intent model can help improve the accuracy of applications such as those related to autonomous vehicles and driving. In addition, critical resources devoted to processing time, memory, and the like can be advantageously saved thus improving object perception, prediction, motion plan generation, and overall navigation functionalities of autonomous vehicles.

More particularly, in some implementations, object detection and forecasting can be determined for a variety of different types of vehicles, robots, and/or other systems. For instance, in some implementations, object detection and forecasting can be determined for a ground-based vehicle (e.g., an automobile), an aircraft, a bike, a scooter and/or another type of vehicle including light electric vehicles. In some implementations, the vehicle can be an autonomous vehicle that can perform various actions including driving, navigating, and/or operating, with minimal and/or no interaction from a human driver. The autonomous vehicle can be configured to operate in one or more modes including, for example, a fully autonomous operational mode, a semi-autonomous operational mode, a park mode, and/or a sleep mode. A fully autonomous (e.g., self-driving) operational mode can be one in which the vehicle can provide driving and navigational operation with minimal and/or no interaction from a human driver present in the vehicle. A semi-autonomous operational mode can be one in which the vehicle can operate with some interaction from a human driver present in the vehicle. Park and/or sleep modes can be used between operational modes while the vehicle performs various actions including waiting to provide a subsequent vehicle service, and/or recharging between operational modes.

More particularly, in some implementations, a computing system associated with a vehicle (e.g., an autonomous vehicle) can receive sensor data from one or more sensors that generate sensor data relative to the autonomous vehicle. In order to autonomously navigate, the autonomous vehicle can include a plurality of sensors (e.g., a LIDAR system, a RADAR system, cameras, etc.) configured to obtain sensor data associated with the autonomous vehicle's surrounding environment as well as the position and movement of the autonomous vehicle. In some implementations, the sensor data can include LIDAR data (e.g., a three-dimensional point cloud) obtained from a LIDAR system. In some implementations, the sensor data can include image data obtained from one or more cameras. In some implementations, the sensor data can include a birds-eye view representation of data obtained relative to the autonomous vehicle. In some implementations, the sensor data can be represented as a multi-dimensional tensor having a height dimension and a time dimension stacked into a channel dimension associated with the multi-dimensional tensor.

More particularly, in some implementations, a computing system associated with an autonomous vehicle can access or otherwise obtain map data indicative of the surrounding geographic environment of an autonomous vehicle. For example, map data can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the map data can be provided in a birds-eye view representation. In some implementations, such a birds-eye view representation of the map data can be generated by rasterization or other suitable processing format.

In accordance with another aspect of the disclosure, a computing system associated with an autonomous vehicle can store or otherwise access a multi-task machine-learned intent model trained to simultaneously determine multiple outputs associated with evaluation of objects within the surrounding environment of an autonomous vehicle. In some implementations, the machine-learned intent model can be trained to determine multiple outputs including at least one detection output and one or more forecasting outputs associated with each detection output.

In some implementations, for example, each detection output can include a detection score indicative of a likelihood that a portion of the sensor data includes an object in one or more predetermined classes (e.g., vehicle, bicycle, pedestrian, background, etc.).

In some implementations, for example, corresponding forecasting outputs associated with each object detected within the surrounding environment of the autonomous vehicle can include at least one discrete variable and at least one continuous variable representative of the forecasted motion of the each object detected within the surrounding environment of the autonomous vehicle.

In some implementations, for example, corresponding forecasting outputs can include a trajectory indicative of the object's expected path towards a goal location. For instance, the trajectory can be represented by trajectory data comprising a sequence of bounding shapes (e.g., bounding boxes) at a plurality of timestamps. In some implementations, the bounding shapes can be indicative of past and current locations for an object or current and future locations for an object. In some implementations, the trajectory can be described by trajectory data at a plurality of timestamps within a predefined prediction timespan. In some implementations, the predefined prediction timespan can be greater than about one (1) second in the future, for example, two (2) seconds, five (5) seconds, ten (10) seconds, etc.

In some implementations, for example, corresponding forecasting outputs can include a discrete behavior intention determined from a predefined group of possible behavior intentions. For example, a discrete behavior intention can be determined from a predefined group of possible behavior intentions including keep lane, turn left, turn right, left change lane, right change lane, stopping/stopped, parked, reverse driving, and/or other behavior intentions.

In accordance with another aspect of the present disclosure, in some implementations, the machine-learned intent model can correspond to one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks.

More particularly, in some implementations, the machine-learned intent model can include a plurality of shared layers that are used at least in part for both determining the at least one detection output indicative of zero or more objects detected within the surrounding environment of the autonomous vehicle and the corresponding forecasting output(s) associated with each object detected within the surrounding environment of the autonomous vehicle. In some implementations, each corresponding forecasting output associated with each object detected within the surrounding environment of the autonomous vehicle includes a first forecasting output corresponding to a trajectory indicative of the object's expected path towards a goal location and a second forecasting output corresponding to a discrete behavior intention determined from a predefined group of possible behavior intentions, and the plurality of shared layers are used for determining the at least one detection output, the first forecasting output (e.g., the trajectory), and the second forecasting output (e.g., the discrete behavior intention).

Still further, in some implementations, the machine-learned intent model can include a first portion of layers that are shared layers and a second portion of layers that are respectively dedicated to different output determinations. For example, the second portion of layers can be positioned structurally after the first portion of layers that include one or more shared layers. The second portion of layers can include respective portions of layers that are used in determining the different respective outputs of the machine-learned intent model, namely the object detection output(s) and the first and/or second forecasting output(s).

By providing a machine-learned intent model that has been trained to analyze multiple joint variables, improved determination of some parameters (e.g., object detections, object trajectories, object behaviors, etc.) can lead to improved motion planning and navigation of an autonomous vehicle. By co-training a machine-learned intent model across multiple desired parameters (e.g., multiple detection and forecasting outputs), an efficient model can be utilized. In addition, by providing object detection and forecasting that is directly determined from raw sensor data and map data, the disclosed technology can provide more comprehensive analysis and improvement of the object evaluation and autonomous driving applications.

According to another aspect of the disclosure, a computing system associated with an autonomous vehicle can be configured to obtain sensor data generated by one or more sensors configured to generate sensor data relative to the autonomous vehicle, and to obtain map data associated with the surrounding geographic environment of the autonomous vehicle. The computing system can be further configured to provide the sensor data and the map data as input to a machine-learned intent model. In response to providing the sensor data and map data as input to the machine-learned intent model, the intent model can jointly predict multiple outputs including at least one detection output indicative of zero or more objects detected within the surrounding environment of the autonomous vehicle and a corresponding forecasting output associated with motion of each object detected within the surrounding environment of the autonomous vehicle. For example, forecasting outputs can include continuous trajectories and/or discrete behavior intentions as described herein.

According to another aspect of the present disclosure, a computing system associated with an autonomous vehicle can implement additional autonomy processing functionality based on the output of the machine-learned intent model. For example, a motion planning system can determine a motion plan for the autonomous vehicle based at least in part on the detection output(s) and forecasting output(s). Stated differently, given information about the current locations of objects and/or predicted future locations and/or moving paths of proximate objects, the motion planning system can determine a motion plan for the autonomous vehicle that best navigates the autonomous vehicle along a determined travel route relative to the objects at such locations.

As one example, in some implementations, the motion planning system can determine a cost function for each of one or more candidate motion plans for the autonomous vehicle based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the current locations and/or predicted future locations and/or moving paths of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control gas flow, steering, braking, etc.) to execute the selected motion plan.

The systems and methods described herein may provide a number of technical effects and benefits. More particularly, the disclosed technology provides for a novel deep neural network that reasons about both high level behavior and long term trajectories. To accomplish this objective, a machine-learned intent model is configured to exploit the same cues that humans do, for example, motion and prior knowledge about the road topology in the form of maps. Both object detection and motion forecasting can be determined directly from raw sensor data and map data, thus improving the accuracy and robustness of object evaluation relative to solutions in which object detections are first performed and then intent is extracted from derived detection data (e.g., position and motion of detected bounding boxes).

Additional advantages are achieved by framing intent as a combination of discrete decisions of high level behavior and a continuous trajectory designed to reach a goal location. These two levels of intent depend on each other. For example, the changes in the discrete intention can change the planned trajectories, and similarly the feasibility of the trajectory changes the discrete intention. By providing at least one continuous variable (e.g., a trajectory) and at least one discrete variable (e.g., a behavior intention) as forecasting outputs, a more comprehensive and robust forecasting solution is available.

Additional advantages are achieved by utilizing a multi-task machine-learned intent model that includes at least some shared layers for feature and output determination. Such a model configuration accommodates joint optimization of all detection and forecasting tasks, thus fixing potential distribution mismatch problems between tasks when solving them separately, while also enabling the system to propagate uncertainty through the different components. In addition, the disclosed systems and methods are computationally efficient by design as they share the heavy neural network feature computation between all tasks. Effectiveness is realized in the tasks of detection and intent prediction through a system that surpasses known real-time, state-of-the art detectors while outperforming previous intent prediction approaches, both in its continuous and discrete counterparts.

Although the present disclosure is discussed with particular reference to autonomous vehicles, the systems and methods described herein are applicable to the use of machine-learned models for other systems and purposes. For example, the techniques described herein can be implemented and utilized by other computing systems such as, for example, user devices, robotic systems, non-autonomous vehicle systems, etc. (e.g., for improved object detection and forecasting). Further, although the present disclosure is discussed with particular reference to certain networks, the systems and methods described herein can also be used in conjunction with many different forms of machine-learned models in addition or alternatively to those described herein.

Various means can be configured to perform the methods and processes described herein. For example, a computing system can include sensor data obtaining unit(s), map data obtaining unit(s), machine-learned intent model application unit(s), motion planning unit(s), vehicle controlling unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data from one or more sensors that generate sensor data relative to an autonomous vehicle. In some implementations, the means can be configured to obtain sensor data associated with the autonomous vehicle's surrounding environment as well as the position and movement of the autonomous vehicle. In some implementations, the means can be configured to obtain LIDAR data (e.g., a three-dimensional point cloud) obtained from a LIDAR system. In some implementations, the means can be configured to obtain image data obtained from one or more cameras. In some implementations, the means can be configured to obtain a birds-eye view representation of data obtained relative to the autonomous vehicle. In some implementations, the means can be configured to obtain sensor data represented as a multi-dimensional tensor having a height dimension and a time dimension stacked into a channel dimension associated with the multi-dimensional tensor. A sensor data obtaining unit is one example of a means for obtaining such sensor data as described herein.

The means can be configured to access or otherwise obtain map data associated with a surrounding geographic environment of the autonomous vehicle. More particularly, in some implementations, the means can be configured to access or otherwise obtain map data that provides information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the means can be configured to access or otherwise obtain map data that is provided in a birds-eye view representation, such as generated by rasterization or other suitable processing format. A map data obtaining unit is one example of a means for obtaining such map data as described herein.

The means can be configured to provide, as input to a machine-learned intent model, the sensor data and the map data, and to receive, in response to providing the sensor data and map data as input to the machine-learned intent model, a jointly determined prediction from the machine-learned intent model for multiple outputs. The multiple outputs can include one or more of at least one detection output indicative of zero or more objects detected within the surrounding environment of the autonomous vehicle, a first corresponding forecasting output descriptive of a trajectory indicative of an expected path of the zero or more objects towards a goal location, or a second corresponding forecasting output descriptive of a discrete behavior intention determined from a predefined group of possible behavior intentions. A machine-learned intent model application unit is one example of a means for providing the sensor data and map data as inputs to the intent model and receiving multiple outputs therefrom.

The means can be configured to determine a motion plan for the autonomous vehicle based at least in part on the detection output(s) and corresponding forecasting output(s). The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning unit is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit is one example of a means for controlling motion of the autonomous vehicle to execute the motion plan.

With reference now to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
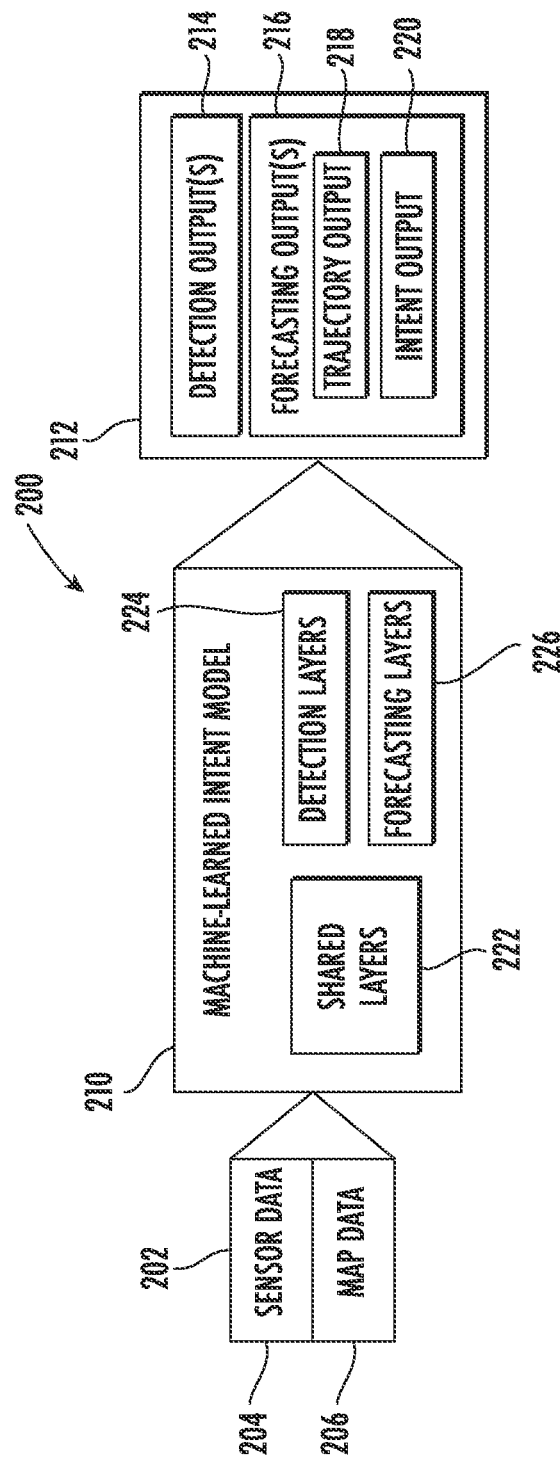
FIG. 2 depicts a block diagram of an example machine-learned intent model according to example embodiments of the present disclosure.

FIG. 2 depicts a block diagram of an example object intention determination system 200 according to example embodiments of the present disclosure. In some implementations, object intention determination system 200 can be implemented as part of a computing system such as but not limited to vehicle computing system 112 of FIG. 1.

In general, object intention determination system 200 includes machine-learned computing components (e.g., a fully-convolutional, deep neural network) that reasons about both high level behavior and long term trajectories. Such components can exploit the same cues that humans do, e.g., motion and prior knowledge about the road topology in the form of maps. Object intention (e.g., "intent") can be framed as a combination of discrete decisions of high level behavior and a continuous goal location, implying a trajectory to reach that objective. These two levels of intent depend on each other as the discrete intention changes the planned trajectories, and the feasibility of the trajectory changes the discrete intention. With these intuitions in mind, object intention determination system 200 can be configured to output one or more detection outputs and forecasting outputs in a single forward pass through a machine-learned intent model. For instance, object intention determination system 200 can be configured to output three types of variables in a single forward pass corresponding to: detection scores for vehicle and background classes, high level actions' probabilities corresponding to discrete intention, and bounding box regressions in the current and future timesteps to represent the intended trajectory. This provides for joint optimization of all tasks, fixing a potential distribution mismatch problem between tasks when solving them separately, while also enabling the object intention determination system 200 to propagate uncertainty through the different components. In addition, this approach is computationally efficient by design as it shares the heavy neural network feature computation between all tasks.

With more particular reference to FIG. 2, object intention determination system 200 can include one or more sources of input data 202, a machine-learned intent model 210, and output data 212 generated by the machine-learned intent model 210 in response to receiving the input data 202. For example, object intention determination system 200 can receive sensor data 204 from one or more sensors that generate sensor data relative to an autonomous vehicle (e.g., vehicle 102 of FIG. 1). In some implementations, sensor data 204 can correspond to a portion of sensor data 116 of FIG. 1. In some implementations, the sensor data 204 can include LIDAR data (e.g., a three-dimensional point cloud) obtained from a LIDAR system. In some implementations, the sensor data 204 can include image data obtained from one or more cameras. In some implementations, the sensor data 204 can include a birds-eye view representation of data obtained relative to the autonomous vehicle (e.g., vehicle 102 of FIG. 1). In some implementations, the sensor data 204 can be represented as a multi-dimensional tensor having a height dimension and a time dimension stacked into a channel dimension associated with the multi-dimensional tensor.

More particularly, in some implementations, object intention determination system 200 can access or otherwise obtain map data 206 indicative of the surrounding geographic environment of an autonomous vehicle. In some implementations, map data 206 can correspond to a portion of map data 122 of FIG. 1. For example, map data 206 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices);

and/or any other map data that provides information that assists the vehicle computing system in processing, analyzing, and perceiving its surrounding environment and its relationship thereto. In some implementations, the map data 206 can be provided in a birds-eye view representation. In some implementations, such a birds-eye view representation of the map data 206 can be generated by rasterization or other suitable processing format.

In accordance with another aspect of the disclosure, object intention determination system 200 can store or otherwise access a multi-task machine-learned intent model 210 trained to simultaneously determine multiple outputs associated with evaluation of objects within the surrounding environment of an autonomous vehicle. In some implementations, the machine-learned intent model 210 can be trained to determine output data 212 including multiple outputs including at least one detection output 214 and one or more forecasting outputs 216 associated with each detection output 214. By training the machine-learned intent model 210 to determine the multiple outputs within output data 212 in a single forward pass, object intention determination system 200 can thus by configured to function as a full perception system (e.g., perception system 124 of FIG. 1) having the ability to detect and track objects that are proximate to a vehicle in a single forward pass through the machine-learned intent model 210.

In some implementations, for example, each detection output 214 can include a detection score indicative of a likelihood that a portion of the sensor data includes an object in one or more predetermined classes (e.g., vehicle, bicycle, pedestrian, background, etc.).

In some implementations, for example, corresponding forecasting outputs 216 associated with each object detected within the surrounding environment of the autonomous vehicle can include at least one discrete variable and at least one continuous variable representative of the forecasted motion of each object detected within the surrounding environment of the autonomous vehicle.

In some implementations, for example, corresponding forecasting outputs 216 can include a trajectory output 218 indicative of an object's expected path towards a goal location. For instance, the trajectory output 218 can be represented by a sequence of bounding shapes (e.g., bounding boxes) indicative of current and future locations for an object. In some implementations, the trajectory output 218 can be described by trajectory data at a plurality of timestamps within a predefined prediction timespan. In some implementations, the predefined prediction timespan can be greater than about one (1) second in the future, for example, two (2) seconds, five (5) seconds, ten (10) seconds, etc.

In some implementations, for example, corresponding forecasting output(s) 216 can include an intent output 220 corresponding, for example, to a discrete behavior intention determined from a predefined group of possible behavior intentions. For example, a discrete behavior intention can be determined from a predefined group of possible behavior intentions including keep lane, turn left, turn right, left change lane, right change lane, stopping/stopped, parked, reverse driving, and/or other behavior intentions.

In accordance with another aspect of the present disclosure, in some implementations, the machine-learned intent model 210 can correspond to one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks.

More particularly, in some implementations, the machine-learned intent model 210 can include a plurality of shared layers 222 that are used at least in part for both determining the at least one detection output 214 indicative of one or more objects detected within the surrounding environment of the autonomous vehicle and the corresponding forecasting output(s) 216 associated with the one or more objects detected within the surrounding environment of the autonomous vehicle. In some implementations, each corresponding forecasting output 216 associated with the one or more objects detected within the surrounding environment of the autonomous vehicle includes a first forecasting output corresponding to a trajectory output 218 indicative of the object's expected path towards a goal location and a second forecasting output corresponding to an intent output 220 (e.g., a discrete behavior intention determined from a predefined group of possible behavior intentions), and the plurality of shared layers 222 are used at least in part for determining the at least one detection output 214, the first forecasting output (e.g., the trajectory output 218), and the second forecasting output (e.g., the intent output 220).

Still further, in some implementations, the machine-learned intent model 210 can include a first portion of layers that are shared layers 222 and a second portion of layers (e.g., detection layers 224 and forecasting layers 226) that are respectively dedicated to different output determinations. For example, the second portion of layers (e.g., detection layers 224 and forecasting layers 226) can be positioned structurally after the first portion of layers that include one or more shared layers 222. The second portion of layers can include respective portions of layers that are used in determining the different respective outputs of the machine-learned intent model 210, namely detection layers 224 configured to determine the object detection output(s) 214 and forecasting layers 226 configured to determine the one or more forecasting output(s) 216.

By providing a machine-learned intent model 210 that has been trained to analyze multiple joint variables, improved determination of some parameters (e.g., object detections, object trajectories, object behaviors, etc.) can lead to improved motion planning and navigation of an autonomous vehicle. By co-training a machine-learned intent model 210 across multiple desired parameters (e.g., multiple detection and forecasting outputs 214/216), an efficient model can be utilized. In addition, by providing object detection and forecasting that is directly determined from raw sensor data 204 and map data 206, the disclosed technology can provide more comprehensive analysis and improvement of the object evaluation and autonomous driving applications.

According to another aspect of the disclosure, object intention determination system 200 can be configured to obtain sensor data 204 generated by one or more sensors configured to generate the sensor data 204 relative to the autonomous vehicle, and to obtain map data 206 associated with the surrounding geographic environment of the autonomous vehicle. The object intention determination system 200 can be further configured to provide the sensor data 204 and the map data 206 as input data 202 to machine-learned intent model 210. In response to providing the sensor data 204 and map data 206 as input to the machine-learned intent model 210, the intent model 210 can jointly predict output data 212 including multiple outputs such as at least one detection output 214 indicative of one or more objects detected within the surrounding environment of the autonomous vehicle and a corresponding forecasting output 216 associated with motion of the one or more objects detected within the surrounding environment of the autonomous vehicle. For example, forecasting outputs 216 can include trajectory output(s) 218 in the form of continuous trajectories and/or intent outputs 220 in the form of discrete behavior intentions as described herein.

FIGS. 3-7 describe various additional aspects associated with the object intention determination system 200 such as depicted in FIG. 2. More particularly, such figures depict specific aspects associated with an approach to jointly detect vehicles and predict their intention directly from raw sensor data. Towards this goal, 3D LIDAR point clouds and dynamic HD maps containing semantic elements such as lanes, intersections and traffic lights can be exploited. The following description relative to FIGS. 3-7 is directed to parametrization, network architecture, learning objective and inference procedure for object intention determination system 200, and particularly a specific implementation of a machine-learned intent model 210.

Figure 3:
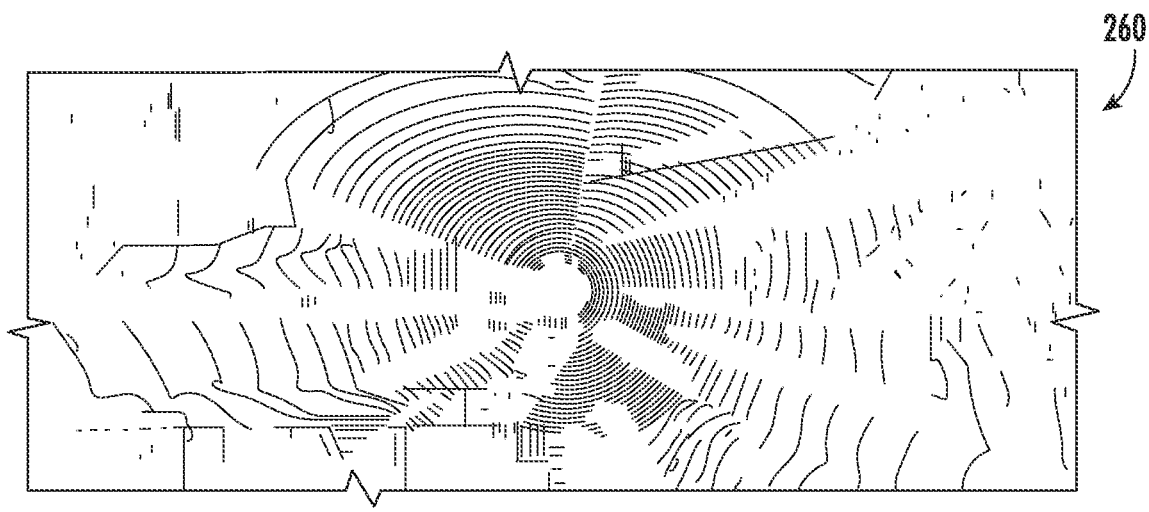
FIG. 3 depicts a graphical representation of example sensor data provided to a machine-learned intent model in the form of voxelized LIDAR data in birds-eye view form according to example embodiments of the present disclosure.

FIG. 3 depicts a graphical representation 260 of example sensor data (e.g., sensor data 204) provided to a machine-learned intent model 210 in the form of voxelized LIDAR data in birds-eye view form according to example embodiments of the present disclosure. With more particular reference to the graphical representation 260 of a 3D point cloud, it should be appreciated that standard convolutional neural networks (CNNs) perform discrete convolutions, assuming a grid structured input. Sensor data (e.g., sensor data 204) corresponding to point clouds in bird's eye view (BEV) can be represented as a 3D tensor, treating height as a channel dimension. This input parametrization has several key advantages: (i) computation efficiency due to dimensionality reduction (made possible as vehicles drive on the ground), (ii) non-overlapping targets (contrary to camera-view representations, where objects can overlap), (iii) preservation of the metric space (undistorted view) that eases the creation of priors regarding vehicles' sizes, and (iv) this representation also facilitates the fusion of LIDAR and map features as both are defined in bird's eye view. Multiple consecutive LIDAR sweeps (corrected by ego-motion) can be utilized as this can be helpful to accurately estimate both intention and motion forecasting. Height and time dimensions can be stacked together into the channel dimension as this allows the use of 2D convolutions to fuse time information. This approach can yield a tensor of size:

$$\left(\frac{L}{\Delta L}, \frac{W}{\Delta W}, \frac{H}{\Delta H} \cdot T\right),$$

where L, W, and H are the longitudinal, transversal and normal physical dimensions of the scene, $\Delta L$, $\Delta W$, and $\Delta H$ are the voxel sizes in the corresponding directions, and T is the number of LIDAR sweeps.

Figure 4:
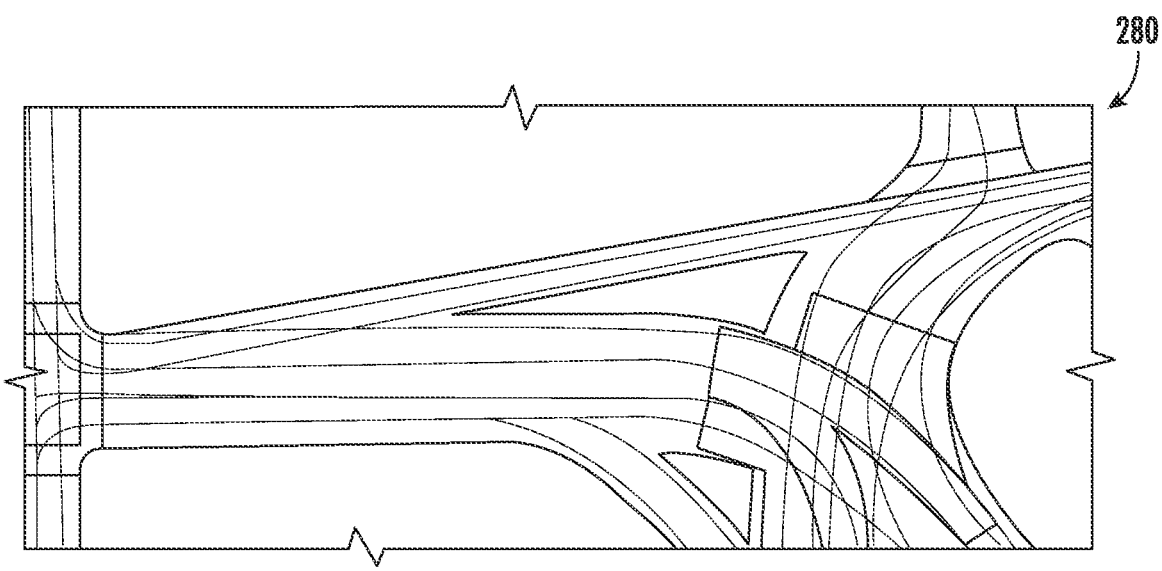
FIG. 4 depicts a graphical representation of example map data provided to a machine-learned intent model in the form of rasterized map data according to example embodiments of the present disclosure.

FIG. 4 depicts a graphical representation 280 of example map data (e.g., map data 206) provided to a machine-learned intent model 210 in the form of rasterized map data according to example embodiments of the present disclosure. With more particular reference to the graphical representation 280 of dynamic map data, a BEV representation of maps can be generated by rasterization. In some implementations, static information can be exploited including roads, lanes, intersections, crossings and traffic signs, in conjunction with traffic lights, which contain dynamic information that changes over time (i.e., traffic light state changes between green, yellow and red). Each semantic component in the map can be represented with a binary map (e.g., values of 1 or −1). Roads and intersections can be represented as filled polygons covering the whole drivable surface. Lane boundaries can be parametrized as poly-lines representing the left and right boundaries of lane segments. In some implementations, three binary masks can be used to distinguish lane types, as lane boundaries can be crossed or not, or only in certain situations. Lane surfaces can be rasterized to distinguish between straight, left and right turns, as this information can be helpful for intention prediction. Two extra binary masks can be used for bike and bus lanes as a way to input a prior of non-drivable road areas. Furthermore, traffic lights can change the drivable region dynamically. The state of the traffic light can be encoded into the lanes they govern. The surface of the lane succeeding the traffic light in one out of three binary masks can be rasterized depending on its state: green, yellow or red. One extra layer can be used to indicate whether those lanes are protected by its governing traffic light, e.g., cars in other lanes must yield. This situation happens in turns when the arrow section of the traffic light is illuminated. Traffic light states can be estimated using cameras in an autonomous vehicle. The state of some unobserved traffic lights that directly interact with known traffic light states can additionally or alternatively be inferred. For example, a straight lane with unknown traffic light state that collides with a protected turn with a green traffic light state can be safely classified as being red. Lastly, traffic signs can also be encoded into their governed lane segments, using two binary masks to distinguish between yields and stops. In one example, there can be seventeen (17) binary masks used as map features, resulting in a 3D tensor that represents the map. Graphical representation 280 of FIG. 4 depicts different elements (e.g., lane markers, crossings, alpha blended traffic lights with their state).

Figure 5:
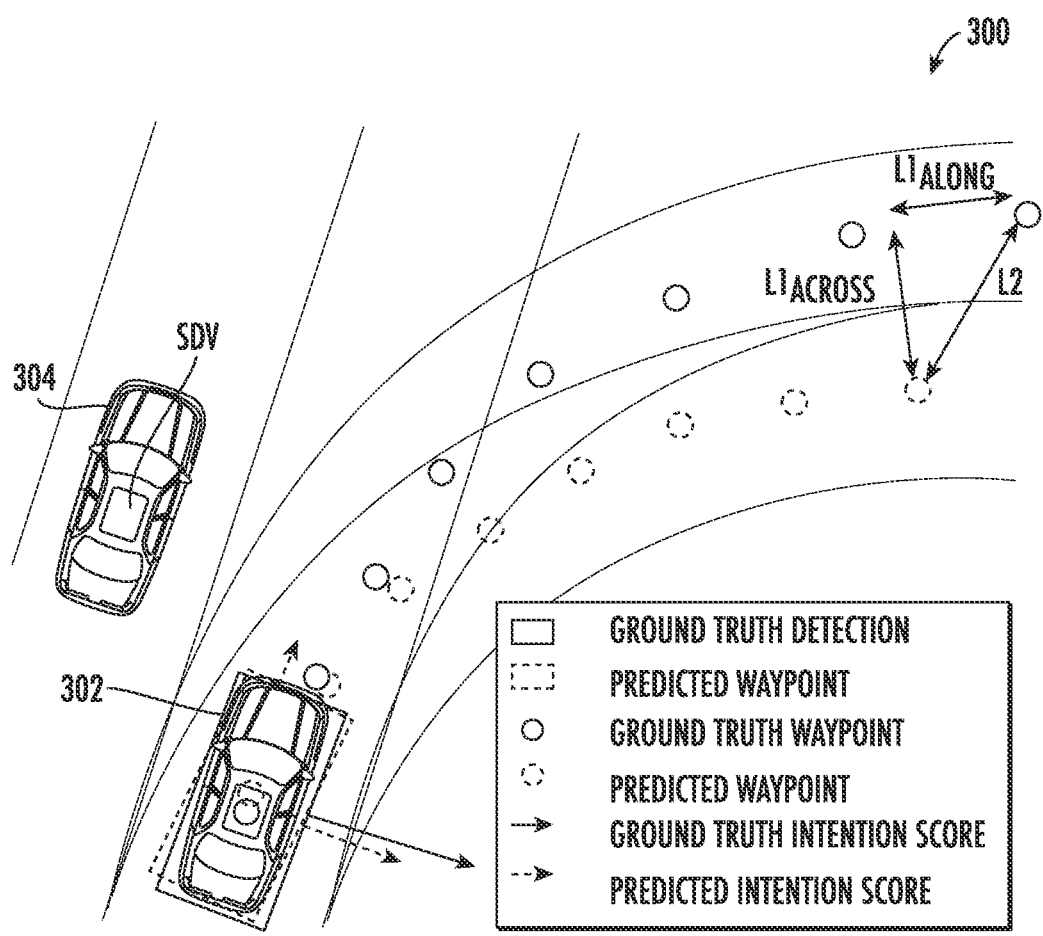
FIG. 5 depicts a graphical representation of example output parameters including detections, trajectory waypoints, and intention scores according to example embodiments of the present disclosure.

FIG. 5 depicts a graphical representation 300 of example output parameters including detections, trajectory data (e.g., waypoints), and intent data (e.g., intent scores) according to example embodiments of the present disclosure. For example, vehicle 302 can correspond to a detected object within the surrounding environment of an autonomous vehicle (e.g., self-driving vehicle (SDV) 304). With more particular reference to example trajectory regression, for each detected vehicle (e.g., vehicle 302), its trajectory can be parametrized as a sequence of bounding boxes, including current and future locations. Assuming cars are non-deformable objects, their size can be treated as a constant estimated by the detector. The pose in each time stamp can be three-dimensional (3D) and contain a bounding box center $(c^t_x, c^t_y)$ and heading $\varphi_t$ of the vehicle 302 in BEV coordinates as shown in FIG. 5. For high level actions, the discrete intention prediction problem can be treated as a multi-class classification with eight (8) classes: keep lane, turn left, turn right, left change lane, right change lane, stopping/stopped, parked and other, where other can be any other action such as but not limited to reversed driving.

Figure 6:
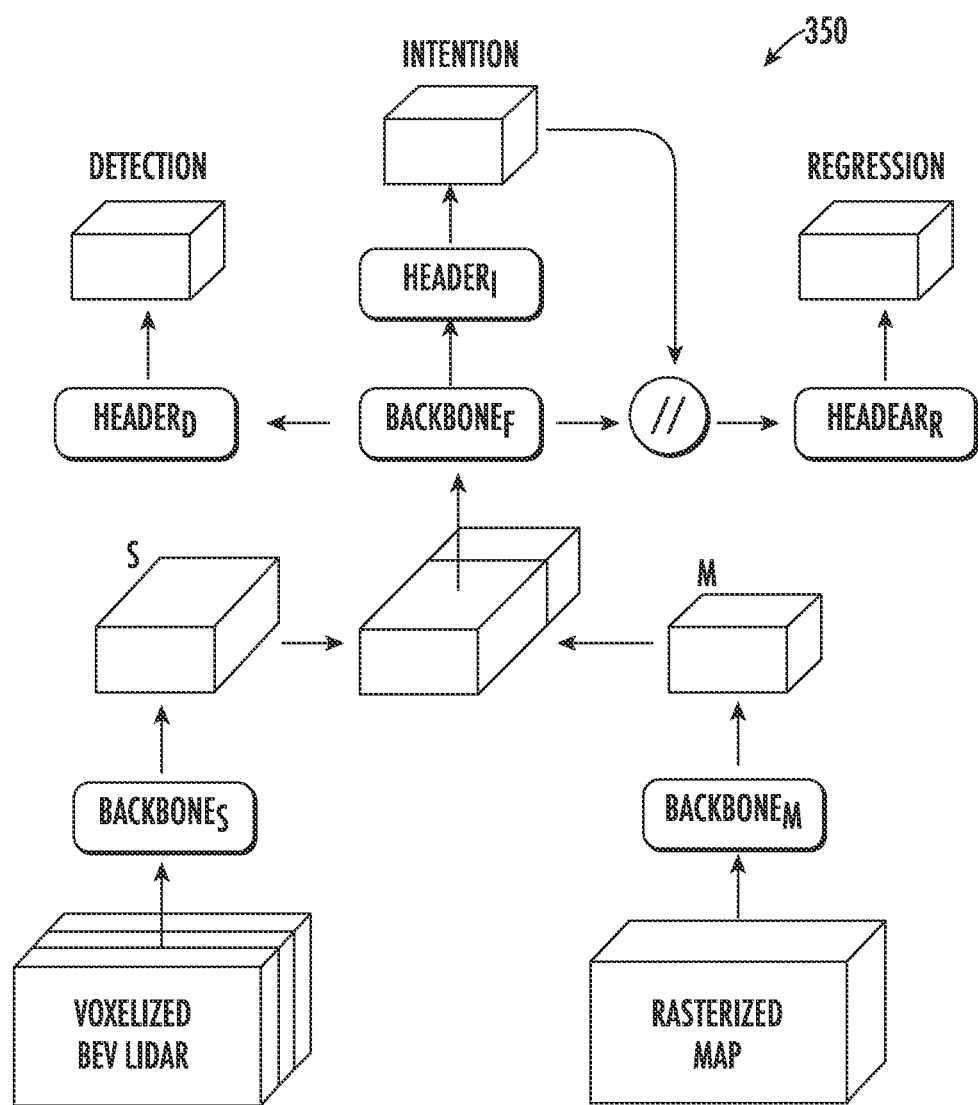
FIG. 6 depicts a graphical representation of architectural details associated with an example machine-learned intent model according to example embodiments of the present disclosure.
Figure 7:
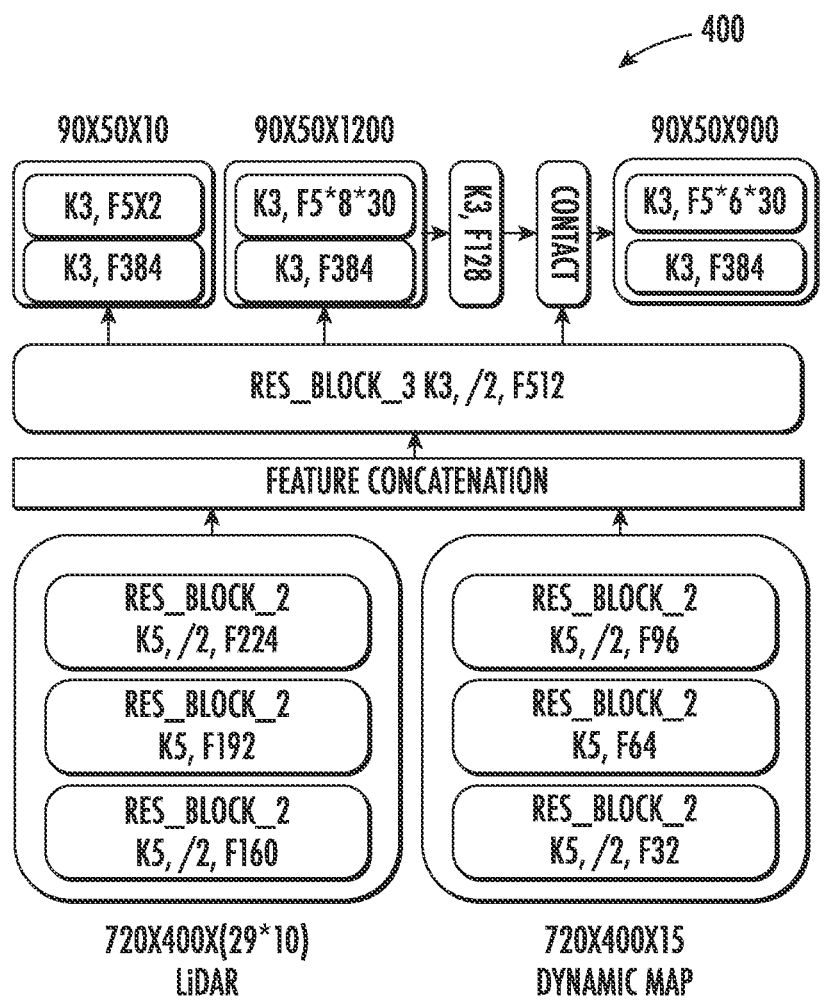
FIG. 7 depicts a graphical representation of layer details associated with an example machine-learned intent model according to example embodiments of the present disclosure.

FIGS. 6 and 7 respectively depict a graphical representation 350 of architectural details and a graphical representation 400 of layer details associated with an example machine-learned intent model according to example embodiments of the present disclosure. An object intention determination system of the present disclosure can more particularly exploit a late fusion of LIDAR and map information through an architecture consisting of a two-stream backbone network and three task-specific branches on top. As illustrated in FIG. 6, a backbone network of the singlestage model can take two 3D tensors as input: the voxelized BEV LIDAR data and rasterization of dynamic map data. A two-stream backbone network can be utilized, where two different 2D CNNs process each data stream separately. The feature maps obtained from those subcomponents can then be concatenated along the depth dimension and fed to the fusion subnetwork. A small downsampling coefficient in a network of 8× can be used since each vehicle represents a small set of pixels in BEV, e.g., when using a resolution of 0.2 m/pixel, the average car occupies 18×8 pixels. To provide accurate long term intention prediction and motion forecasting, the network can extract rich motion information from the past and geometric details of the scene together with traffic rule information. Note that vehicles typically drive at 50 km/h in urban scenes, traversing 42 meters in only 3 seconds. Thus, the network can have a sufficiently large effective receptive field to extract the desired information. To keep both coarse and fine grained features, residual connections can be exploited. Additional details of the network architecture are illustrated in graphical representation 400 of FIG. 7.

With continued reference to a header network of FIGS. 6-7, the header network can be composed of three task specific branches that take as input the shared features from the backbone network. The detection branch outputs two scores for each anchor box at each feature map location, one for vehicle and one for background. An anchor is a predefined bounding box with orientation that serves as a prior for detection. Multiple anchors can be used for each feature map location. The intention network can perform a multi-class classification over the set of high level actions, assigning a calibrated probability to the 8 possible behaviors at each feature map location. The discrete intention scores are in turn fed into an embedding convolutional layer to provide extra features to condition the motion estimation. The motion estimation branch receives the concatenation of the shared features and the embedding from the high level action scores, and outputs the predicted trajectories for each anchor box at each feature map location.

In some implementations, additional considerations can be implemented relative to training/learning associated with a machine-learned intent model. For example, such a model can be fully differentiable and thus can be trained end-to-end through back-propagation. A multi-task loss can be minimized, containing a regression term for the trajectory prediction over T time steps, a binary classification for the detection (background vs vehicle) and a multi-class classification for discrete intention. Thus:

$$\mathcal{L}(\theta) = \mathcal{L}_{cla}(\theta) + \alpha \cdot \sum_{t=0}^{T} \lambda^t \cdot \mathcal{L}_{int}^t(\theta) + \beta \cdot \sum_{t=0}^{T} \lambda^t \cdot \mathcal{L}_{reg}^t(\theta)$$

where t=0 is the current frame and t>0 the future, θ the model parameters and λ a temporal discount factor to ensure the later times do not dominate the loss. With respect to detection, a binary focal loss can be employed, computed over all feature map locations and predefined anchor boxes, assigned using a matching strategy defined as:

$$\mathcal{L}_{cla}(\theta) = \sum_{i,j,k} -(1 - \bar{p}_{i,j,k;\theta}) \cdot \log \bar{p}_{i,j,k;\theta}, \quad \bar{p}_{i,j,k;\theta} = \begin{cases} p_{i,j,k;\theta} & \text{if } q_{i,j,k} = 1, \\ 1 - p_{i,j,k;\theta} & \text{otherwise} \end{cases}$$

where i, j are the location indices on the feature map and k is the index over the predefined set of anchor boxes; $q_{i,j,k}$ is the class true label and $p_{i,j,k;\theta}$ the predicted probability. Positive samples can be defined as $q_{i,j,k}=1$, those predefined anchor boxes having an associated ground truth box. In particular, for each anchor box, a ground truth box with the biggest intersection over union (IoU) can be found. If the IoU is bigger than a threshold value (e.g., 0.5), a one (1) can be assigned to its corresponding label $q_{i,j,k}$. In case there is a ground truth box that has not been assigned to any anchor box, it can be assigned to the highest overlapping anchor box ignoring the threshold. Due to the imbalance of positive and negative samples it can be helpful to not only use focal loss but also to apply hard negative mining during training. Thus, all negative samples can be ranked by their predicted score $p_{i,j,k}$ and take the top negative samples with a ratio of 3:1 with respect to the number of positive samples.

With respect to trajectory regression, the detector regression targets can be framed as a function of the dimensions of their associated anchor boxes. As data determinations occur in BEV, all objects have similar size as no perspective effect is involved. Thus, object shape priors can be exploited to make anchor boxes similar to real object size. This helps reduce the variance of the regression targets, leading to better training. In particular, the following can be defined:

$$\overline{c_x^t} = \frac{c_x^t - c_x^{anchor}}{w^{anchor}} \quad \overline{\phi_{sin}^t} = \sin\phi^t \quad \overline{w} = \log\frac{w}{w^{anchor}}$$

$$\overline{c_y^t} = \frac{c_y^t - c_y^{anchor}}{h^{anchor}} \quad \overline{\phi_{cos}^t} = \cos\phi^t \quad \overline{h} = \log\frac{h}{h^{anchor}}$$

A weighted smooth L1 loss can be applied to the regression targets associated to the positive samples only. More precisely, the loss over the regression target set $R_t$ can be applied, which for t∈[1, T] (forecasting) does not include the bounding box size as previously explained.

$$\mathcal{L}_{reg}^t(\theta) = \sum_{r \in R} w_r \cdot l_{r;\theta}^t, \quad l_{r;\theta}^t = \begin{cases} 0.5 \cdot (x_{r;\theta}^t - y_r^t)^2, & \text{if } |x_{r;\theta}^t - y_r^t| < 1 \\ |x_{r;\theta}^t - y_r^t| - 0.5, & \text{otherwise} \end{cases}$$

where $x_{r;\theta}^t$ refers to the predicted value of the r-th regression target and $y_r^t$ is the ground truth value of such regression target, both at prediction time step t.

With respect to intention prediction, a cross entropy loss over the set of high level actions can be employed. To address the high imbalance in the intention distribution, the dominant classes can be downsampled {keep lane, stopping/stopped and parked} by 95%. In some implementations, this strategy was found to work better than re-weighting the loss by the inverse portion of examples for each class in the training set. Note that those examples are not discarded for detection and trajectory regression.

During inference, an object intention determination system in accordance with the disclosed technology can produce 3D detections with their respective continuous and discrete intentions for all vehicles in the scene in a single forward pass. Preliminary detections can be extracted by applying a threshold of 0.1 to the classification probabilities, with the intention of achieving high recall. From these feature map locations, the regression targets and anchor boxes can be determined. Then, non-maximum suppression (NMS) can be used to de-duplicate detections. Since the disclosed model can predict future waypoints for each vehicle, it provides a strong prior for associating detections among different time steps. At any time step, a detection can be determined from the current forward pass and predictions produced at previous time steps. Therefore, by comparing the current location against past predictions of the future, tracklets can be decoded for each vehicle in the scene. This simple tracking system can allow recovery of missing false negatives and discarding false positives by updating the classification scores based on previous predictions.

Concerning implementation details, in some particular implementations, a birds eye view (BEV) region of L=144, W=80 meters from the center of the autonomous vehicle and H=5.8 meters from the ground, for both training and evaluation. We set the resolution to be DL=DW=DH=0.2 meters. T=10 past LIDAR sweeps can be used to provide enough context in order to perform accurate longer term prediction of three (3) seconds. Thus, one example input can be a 3D tensor of shape (29·10, 720, 400). We can use five (5) predefined anchor boxes of size 3.2 meters and 1:1, 1:2, 2:1, 1:6, 6:1, and a threshold of 0.1 for the classification score to consider a detection positive during inference. The model can be trained from scratch using Adam optimizer, a learning rate of 1e-4 and a weight decay of 1e-4. A temporal discount factor $\lambda$=0.97 can be employed for future predictions. A batch of size six (6) can be used for each GPU and perform distributed training on 8 Nvidia 1080 GPUs for around 24 h.

Figure 8:
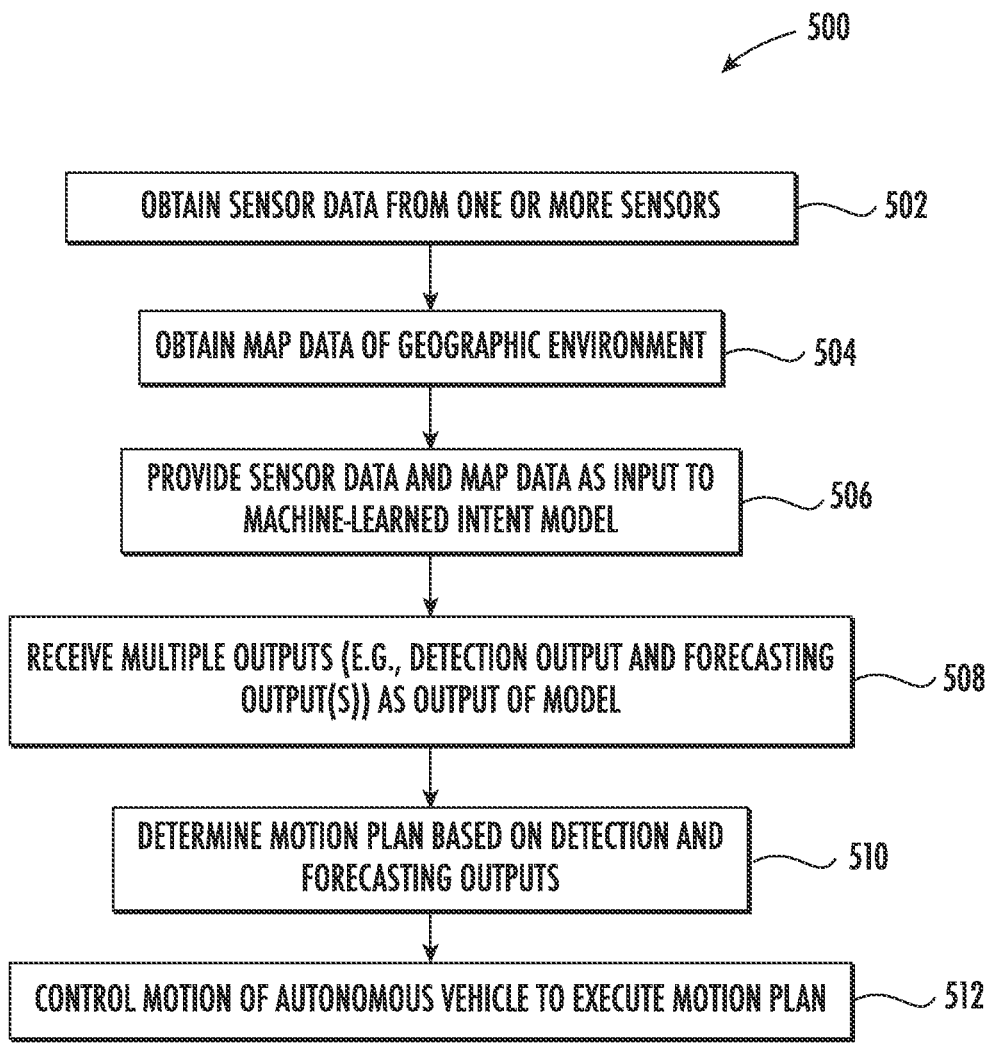
FIG. 8 depicts a flowchart diagram of an example machine learning method according to example embodiments of the present disclosure.

FIG. 8 depicts a flow chart diagram of an example method 500 according to example embodiments of the present disclosure. One or more portion(s) of the method 500 can be implemented by one or more computing devices such as, for example, the computing device(s) within vehicle computing system 112 of FIG. 1, object intention determination system 200 of FIG. 2, or computing system 710 of FIG. 10. Moreover, one or more portion(s) of the method 500 can be implemented as an algorithm on the hardware components of the device(s) described herein to, for example, determine object intention and associated motion planning for an autonomous vehicle.

Referring more particularly to FIG. 8, a computing system (e.g., object intention determination system 200 of FIG. 2) including one or more computing devices can implement one or more steps of method 500. At 502, method 500 can include obtaining/receiving sensor data from one or more sensors configured to generate the sensor data relative to an autonomous vehicle. In some implementations, the sensor data obtained at 502 can correspond to sensor data 116 of FIG. 1 and/or sensor data 204 of FIG. 2. In some implementations, the sensor data obtained at 502 can include a birds-eye view representation of LIDAR data obtained relative to an autonomous vehicle. In some implementations, such a birds-eye view representation of the LIDAR data can be represented as a multi-dimensional tensor having a height dimension and a time dimension stacked into a channel dimension associated with the multi-dimensional tensor.

At 504, method 500 can include obtaining/receiving map data associated with a surrounding geographic environment of the autonomous vehicle. In some implementations, the map data obtained at 504 can correspond to map data 122 of FIG. 1 and/or map data 206 of FIG. 2. In some implementations, the map data obtained at 504 can be a birds-eye view representation of a surrounding geographic environment of the autonomous vehicle.

At 506, method 500 can include providing as input to a machine-learned intent model, the sensor data and the map data (e.g., the sensor data obtained at 502 and the map data obtained at 504). At 508, method 500 can include receiving, in response to providing the sensor data and map data as input to the machine-learned intent model at 506, a jointly determined prediction from the machine-learned intent model for multiple outputs. The multiple outputs received at 508 can include one or more of: at least one detection output indicative of one or more objects detected within the surrounding environment of the autonomous vehicle, a first corresponding forecasting output descriptive of a trajectory indicative of an expected path of the one or more objects towards a goal location, and/or a second corresponding forecasting output descriptive of a discrete behavior intention determined from a predefined group of possible behavior intentions.

At 510, method 500 can include determining a motion plan based on the detection and forecasting outputs determined by the machine-learned intent model. In some implementations, determining a motion plan at 510 can be implemented by motion planning system 128 of FIG. 1.

At 512, method 500 can include controlling motion of an autonomous vehicle (e.g., vehicle 102 of FIG. 1) based at least in part on the motion plan determined at 510. In some implementations, controlling motion of an autonomous vehicle can be implemented by vehicle control system 138.

Although FIG. 8 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

Figure 9:
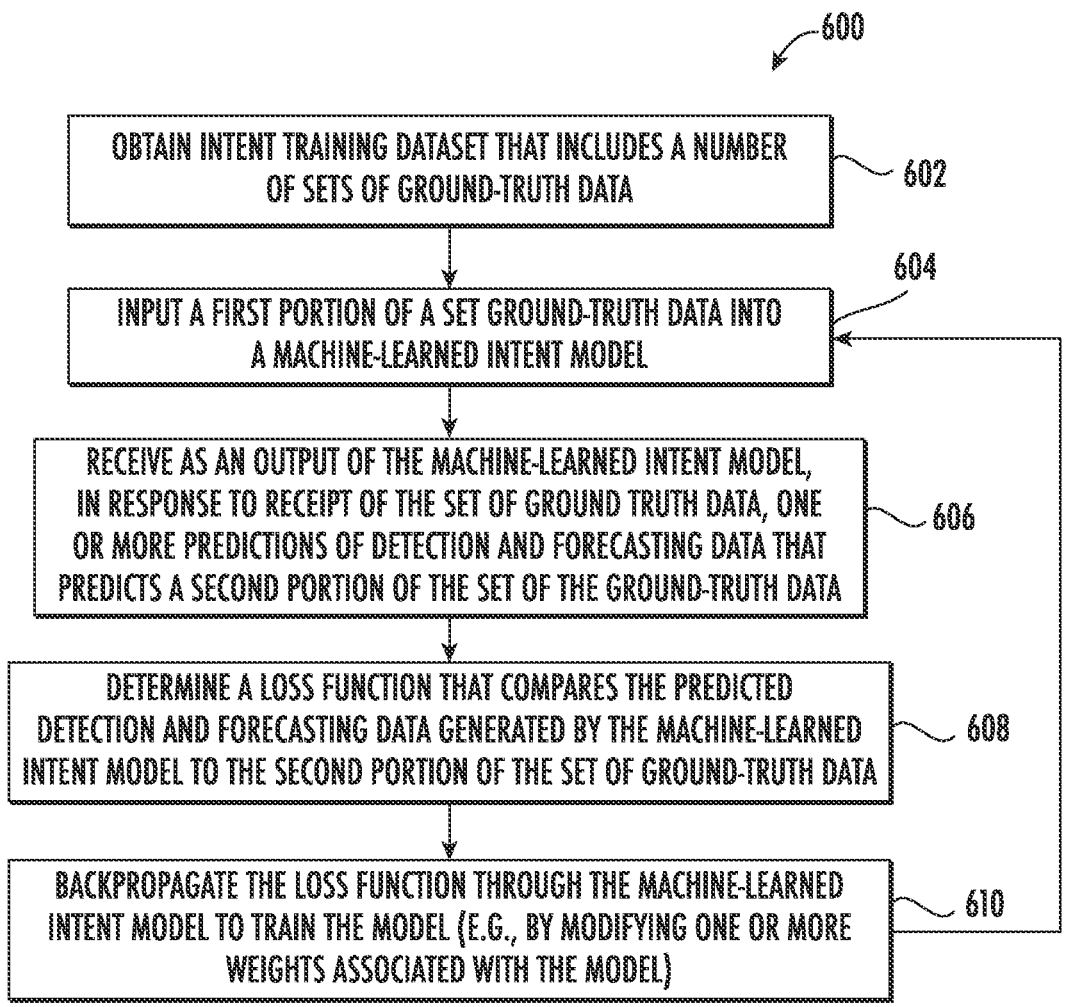
FIG. 9 depicts a flowchart diagram of an example method of training a machine-learned intent model according to example embodiments of the present disclosure.

FIG. 9 depicts a flow chart diagram of an example model training method 600 according to example embodiments of the present disclosure. One or more portion(s) of the model training method 600 can be implemented by one or more computing devices such as, for example, the computing device(s) within vehicle computing system 112 of FIG. 1, object intention determination system 200 of FIG. 2, or remote computing system 750 of FIG. 10. Moreover, one or more portion(s) of the model training method 600 can be implemented as an algorithm on the hardware components of the device(s) described herein to, for example, determine object intention and associated motion planning for an autonomous vehicle.

Referring more particularly to FIG. 9, a computing system including one or more computing devices can implement one or more steps of method 600. At 602, method 600 can involve one or more computing devices included within a computing system (e.g., computing systems 104, 112, 200 710, 750, and/or the like) obtaining an intent training dataset that includes a number of sets of ground-truth data. For example, to train a machine-learned intent model (e.g., machine-learned intent model 210 of FIG. 2) to analyze sensor data and map data and generate jointly determined outputs including detection output(s) and forecasting output(s), an intent training dataset can be obtained that includes a large number of previously obtained representations of sensor data and map data as well as corresponding labels that describe corresponding detection and forecasting outputs associated with the corresponding sensor data and map data.

The intent training dataset can include a first portion of data corresponding to one or more representations of sensor data and map data. The sensor data and map data can, for example, be recorded or otherwise determined while a vehicle is in navigational operation and/or the like. The intent training dataset can further include a second portion of data corresponding to labels identifying detected objects and or corresponding forecasting outputs including trajectory data and intent data. The labels included within the second portion of data within the training dataset can be manually annotated, automatically annotated, or annotated using a combination of automatic labeling and manual labeling.

At 604, the computing system can input a first portion of a set of ground-truth data into a machine-learned intent model. For example, to train the intent model, a training computing system can input a first portion of a set of ground-truth data (e.g., the first portion of the training dataset corresponding to the one or more representations of sensor data and map data) into the machine-learned intent model to be trained.

At 606, the computing system can receive as output of the machine-learned intent model, in response to receipt of the ground-truth data, one or more predictions of object intention data that predict a second portion of the set of ground-truth data. For example, in response to receipt of a first portion of a set of ground-truth data, the machine-learned intent model can output detection data and forecasting data, for example, trajectory data and intent data. This output of the machine-learned intent model can predict the remainder of the set of ground-truth data (e.g., the second portion of the training dataset).

At 608, the computing system can determine a loss function that compares the predicted object intention data generated by the machine-learned intent model to the second portion of the set of ground-truth data. For example, after receiving such predictions, a training computing system can apply or otherwise determine a loss function that compares the object intention data output by the machine-learned intent model to the remainder of the ground-truth data (e.g., ground-truth labels) which the intent model attempted to predict.

At 610, the computing system can backpropagate the loss function through the machine-learned intent model to train the model (e.g., by modifying one or more weights associated with the model). This process of inputting ground-truth data, determining a loss function, and backpropagating the loss function through the intent model can be repeated numerous times as part of training the intent model. For example, the process can be repeated for each of numerous sets of ground-truth data provided within the intent training dataset.

Figure 10:
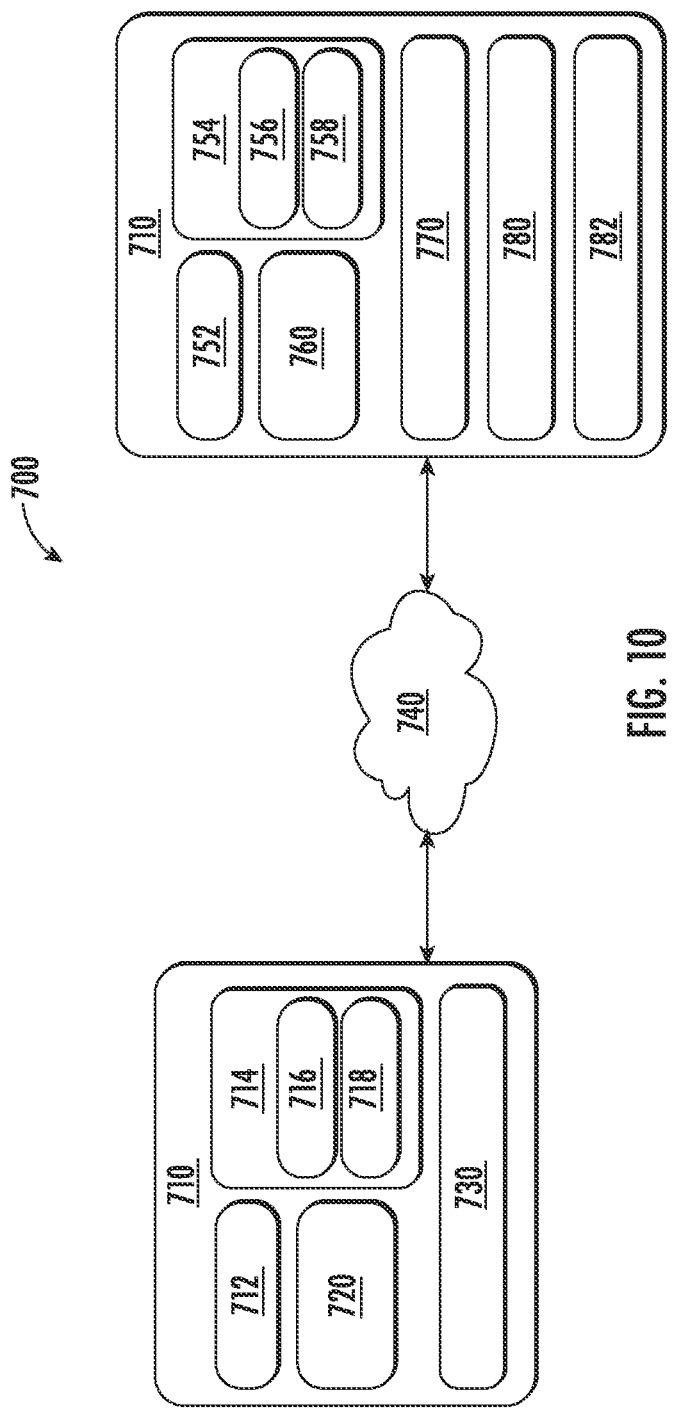
FIG. 10 depicts a block diagram of an example computing system according to example embodiments of the present disclosure.

FIG. 10 depicts a block diagram of an example computing system 700 according to example embodiments of the present disclosure. The example computing system 700 includes a computing system 710 and a machine learning computing system 750 that are communicatively coupled over a network 740.

In some implementations, the computing system 710 can perform various operations including the determination of one or more object intentions as described herein (e.g., detection data and forecasting data associated with one or more objects of interest in the environment surrounding an autonomous vehicle). In some implementations, the computing system 710 can be included in an autonomous vehicle (e.g., the vehicle 102 of FIG. 1). For example, the computing system 710 can be on-board the autonomous vehicle. In other implementations, the computing system 710 is not located on-board the autonomous vehicle. For example, the computing system 710 can operate offline to determine object intentions. Further, the computing system 710 can include one or more distinct physical computing devices.

The computing system 710 includes one or more processors 712 and a memory 714. The one or more processors 712 can be any suitable processing device (e.g., a processor core, a microprocessor, an ASIC, a FPGA, a controller, and/or a microcontroller) and can be one processor or a plurality of processors that are operatively connected. The memory 714 can include one or more non-transitory computer-readable storage media, including RAM, ROM, EEPROM, EPROM, one or more memory devices, flash memory devices, and/or combinations thereof.

The memory 714 can store information that can be accessed by the one or more processors 712. For instance, the memory 714 (e.g., one or more non-transitory computer-readable storage mediums, memory devices) can store data 716 that can be obtained, received, accessed, written, manipulated, created, and/or stored. The data 716 can include, for instance, data associated with the determination of object detections and intentions as described herein. In some implementations, the computing system 710 can obtain data from one or more memory devices that are remote from the system 710.

The memory 714 can also store computer-readable instructions 718 that can be executed by the one or more processors 712. The instructions 718 can be software written in any suitable programming language or can be implemented in hardware. Additionally, or alternatively, the instructions 718 can be executed in logically and/or virtually separate threads on the one or more processors 712.

For example, the memory 714 can store instructions 718 that when executed by the one or more processors 712 cause the one or more processors 712 to perform any of the operations and/or functions described herein, including, for example, determining object intentions.

According to an aspect of the present disclosure, the computing system 710 can store or include one or more machine-learned models 730. As examples, the machine-learned models 730 can be or can otherwise include various machine-learned models including, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks. In some implementations, machine-learned models 730 can include a machine-learned intent model (e.g., machine-learned intent model 210 of FIG. 2).

In some implementations, the computing system 710 can receive the one or more machine-learned models 730 from the machine learning computing system 750 over the network 740 and can store the one or more machine-learned models 730 in the memory 714. The computing system 710 can then use or otherwise implement the one or more machine-learned models 730 (e.g., by the one or more processors 712). In particular, the computing system 710 can implement the one or more machine-learned models 730 to determine object intentions including detection data and forecasting data.

The machine learning computing system 750 includes one or more processors 752 and memory 754. The one or more processors 752 can be any suitable processing device (e.g., a processor core, a microprocessor, an ASIC, a FPGA, a controller, and/or a microcontroller) and can be one processor or a plurality of processors that are operatively connected. The memory 754 can include one or more non-transitory computer-readable storage media, including RAM, ROM, EEPROM, EPROM, one or more memory devices, flash memory devices, and/or combinations thereof.

The memory 754 can store information that can be accessed by the one or more processors 752. For instance, the memory 754 (e.g., one or more non-transitory computer-readable storage mediums, memory devices) can store data 756 that can be obtained, received, accessed, written, manipulated, created, and/or stored. The data 756 can include, for instance, data associated with the determination of the object intentions including detection outputs and forecasting outputs such as trajectory data, intent data, and/or the like as described herein. In some implementations, the machine learning computing system 750 can obtain data from one or more memory devices that are remote from the system 750.

The memory 754 can also store computer-readable instructions 758 that can be executed by the one or more processors 752. The instructions 758 can be software written in any suitable programming language or can be implemented in hardware. Additionally, or alternatively, the instructions 758 can be executed in logically and/or virtually separate threads on the one or more processors 752.

For example, the memory 754 can store instructions 758 that when executed by the one or more processors 752 cause the one or more processors 752 to perform any of the operations and/or functions described herein, including, for example, determining object intentions and the like.

In some implementations, the machine learning computing system 750 includes one or more server computing devices. If the machine learning computing system 750 includes multiple server computing devices, such server computing devices can operate according to various computing architectures, including, for example, sequential computing architectures, parallel computing architectures, or some combination thereof.

In addition or alternatively to the one or more machine-learned models 730 at the computing system 710, the machine learning computing system 750 can include one or more machine-learned models 770. As examples, the one or more machine-learned models 770 can be or can otherwise include various machine-learned models including, for example, neural networks (e.g., deep convolutional neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks. In some implementations, machine-learned models 770 can include a machine-learned intent model (e.g., machine-learned intent model 210 of FIG. 2).

As an example, the machine learning computing system 750 can communicate with the computing system 710 according to a client-server relationship. For example, the machine learning computing system 750 can implement the one or more machine-learned models 770 to provide a service to the computing system 710. For example, the service can provide for determining object intentions as described herein.

Thus the one or more machine-learned models 730 can be located and used at the computing system 710 and/or the one or more machine-learned models 770 can be located and used at the machine learning computing system 750.

In some implementations, the machine learning computing system 750 and/or the computing system 710 can train the machine-learned models 730 and/or 770 through use of a model trainer 780. The model trainer 780 can train the machine-learned models 730 and/or 770 using one or more training or learning algorithms. One example training technique involves implementation of the method 600 of FIG. 9.

One example training technique is backwards propagation of errors. In some implementations, the model trainer 780 can perform supervised training techniques using a set of labeled training data. In other implementations, the model trainer 780 can perform unsupervised training techniques using a set of unlabeled training data. The model trainer 780 can perform a number of generalization techniques to improve the generalization capability of the models being trained. Generalization techniques include weight decays, dropouts, or other techniques.

In particular, the model trainer 780 can train the one or more machine-learned models 730 and/or the one or more machine-learned models 770 based on a set of training data 782. The training data 782 can include, for example, a plurality of sensor data and map data and corresponding labels that describe corresponding object intentions including trajectories and behavior intentions, and/or the like. The model trainer 780 can be implemented in hardware, firmware, and/or software controlling one or more processors.

The computing system 710 can also include a network interface 720 used to communicate with one or more systems or devices, including systems or devices that are remotely located from the computing system 710. The network interface 720 can include any circuits, components, and/or software, for communicating with one or more networks (e.g., the network 740). In some implementations, the network interface 720 can include, for example, one or more of a communications controller, receiver, transceiver, transmitter, port, conductors, software, and/or hardware for communicating data. Similarly, the machine learning computing system 750 can include a network interface 760.

The networks 740 can be any type of network or combination of networks that allows for communication between devices. In some embodiments, the network 740 can include one or more of a local area network, wide area network, the Internet, secure network, cellular network, mesh network, peer-to-peer communication link, and/or some combination thereof, and can include any number of wired or wireless links. Communication over the network 740 can be accomplished, for instance, via a network interface using any type of protocol, protection scheme, encoding, format, and/or packaging.

FIG. 10 illustrates one example computing system 700 that can be used to implement the present disclosure. Other computing systems can be used as well. For example, in some implementations, the computing system 710 can include the model trainer 780 and the training dataset 782. In such implementations, the machine-learned models 730 can be both trained and used locally at the computing system 710. As another example, in some implementations, the computing system 710 is not connected to other computing systems.

In addition, components illustrated and/or discussed as being included in one of the computing systems 710 or 750 can instead be included in another of the computing systems 710 or 750. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 11:
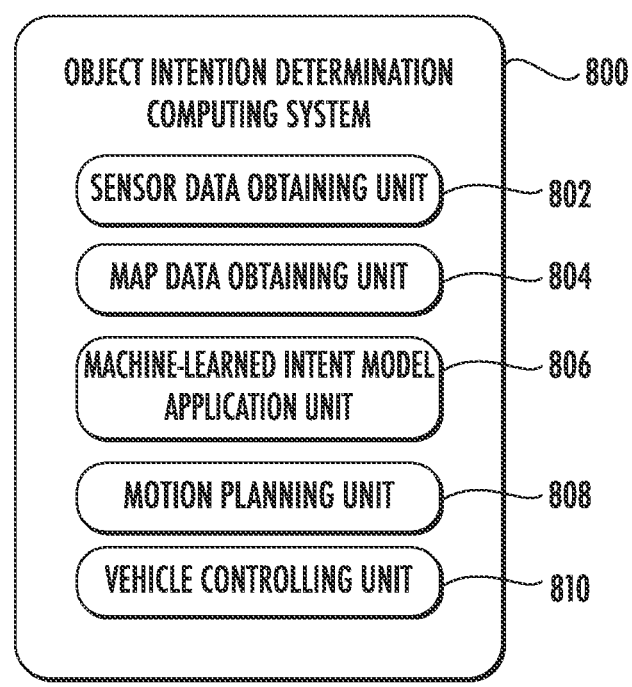
FIG. 11 depicts an example system with units for performing operations and functions according to example embodiments of the present disclosure.

Various means can be additionally or alternatively configured to perform the methods and processes described herein. FIG. 11 depicts an example system 800 with units 802-810 for performing operations and functions according to example embodiments of the present disclosure. For example, an object intention determination computing system 800 can include sensor data obtaining unit(s) 802, map data obtaining unit(s) 804, machine-learned intent model application unit(s) 806, motion planning unit(s) 808, vehicle controlling unit(s) 810, and/or other means for performing the operations and functions described herein. In some implementations, one or more of the units 802-810 may be implemented separately. In some implementations, one or more units 802-810 may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., sensor data obtaining unit(s) 802) can be configured to obtain sensor data from one or more sensors that generate sensor data relative to an autonomous vehicle. In some implementations, the means (e.g., sensor data obtaining unit(s) 802) can be configured to obtain sensor data associated with the autonomous vehicle's surrounding environment as well as the position and movement of the autonomous vehicle. In some implementations, the means (e.g., sensor data obtaining unit(s) 802) can be configured to obtain LIDAR data (e.g., a three-dimensional point cloud) obtained from a LIDAR system. In some implementations, the means (e.g., sensor data obtaining unit(s) 802) can be configured to obtain image data obtained from one or more cameras. In some implementations, the means (e.g., sensor data obtaining unit(s) 802) can be configured to obtain a birds-eye view representation of data obtained relative to the autonomous vehicle. In some implementations, the means (e.g., sensor data obtaining unit(s) 802) can be configured to obtain sensor data represented as a multi-dimensional tensor having a height dimension and a time dimension stacked into a channel dimension associated with the multi-dimensional tensor. A sensor data obtaining unit 802 is one example of a means for obtaining such sensor data as described herein.

The means can be configured to access or otherwise obtain map data associated with a surrounding geographic environment of the autonomous vehicle. More particularly, in some implementations, the means can be configured to access or otherwise obtain map data that provides information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the means can be configured to access or otherwise obtain map data that is provided in a birds-eye view representation, such as generated by rasterization or other suitable processing format. A map data obtaining unit 804 is one example of a means for obtaining such map data as described herein.

The means can be configured to provide, as input to a machine-learned intent model, the sensor data and the map data, and to receive, in response to providing the sensor data and map data as input to the machine-learned intent model, a jointly determined prediction from the machine-learned intent model for multiple outputs. The multiple outputs can include one or more of at least one detection output indicative of one or more objects detected within the surrounding environment of the autonomous vehicle, a first corresponding forecasting output descriptive of a trajectory indicative of an expected path of the one or more objects towards a goal location, or a second corresponding forecasting output descriptive of a discrete behavior intention determined from a predefined group of possible behavior intentions. A machine-learned intent model application unit 806 is one example of a means for providing the sensor data and map data as inputs to the intent model and receiving multiple outputs therefrom.

The means can be configured to determine a motion plan for the autonomous vehicle based at least in part on the detection output(s) and corresponding forecasting output(s). The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning unit 808 is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit 810 is one example of a means for controlling motion of the autonomous vehicle to execute the motion plan.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for detecting and forecasting an actor in an environment of an autonomous vehicle, comprising:
   obtaining sensor data descriptive of the environment of the autonomous vehicle, the environment containing the actor;
   obtaining map data associated with the environment; and
   processing the sensor data and the map data with a single forward pass through a machine-learned model that is trained to jointly implement detection and forecasting to generate:
      a detection output descriptive of the actor in the environment;
      a first forecasting output descriptive of a trajectory indicative of an expected path of the actor towards a goal location; and
      a second forecasting output descriptive of a discrete behavior intention determined from a predefined group of possible behavior intentions for the actor.

2. The method of claim 1, wherein the detection output comprises a detection score indicative of a likelihood of the actor being in one of a plurality of predetermined classes.

3. The method of claim 1, wherein the detection output comprises a bounding box associated with the actor.

4. The method of claim 1, wherein the first forecasting output is represented by trajectory data comprising a sequence of bounding shapes at a plurality of time stamps.

5. The method of claim 1, wherein the predefined group of possible behavior intentions for the actor comprises at least one of keep lane, turn left, turn right, left change lane, right change lane, stopped, parked, or reverse driving.

6. The method of claim 1, wherein the machine-learned model comprises a plurality of shared layers that are used at least in part for determining the detection output, the first forecasting output, and the second forecasting output.

7. The method of claim 1, wherein processing the sensor data and the map data with the machine-learned model comprises processing a fused representation of a given view of the sensor data obtained relative to the autonomous vehicle and the map data in the given view.

8. The method of claim 7, wherein the given view of the sensor data and the map data comprises a birds-eye view.

9. The method of claim 7, wherein the given view of the sensor data is represented as a multi-dimensional tensor having at least one of a height dimension or a time dimension stacked into a channel dimension with the multi-dimensional tensor.

10. An autonomous vehicle (AV) control system, comprising:
    one or more processors; and
    one or more non-transitory computer-readable media that store instructions for execution by the one or more processors that cause the AV control system to perform operations, the operations comprising:
       obtaining sensor data descriptive of an environment of an autonomous vehicle, the environment containing an actor;
       obtaining map data associated with the environment; and
       processing the sensor data and the map data with a single forward pass through a machine-learned model that is trained to jointly implement detection and forecasting to generate:
          a detection output descriptive of the actor in the environment;
          a first forecasting output descriptive of a trajectory indicative of an expected path of the actor towards a goal location; and
          a second forecasting output descriptive of a discrete behavior intention determined from a predefined group of possible behavior intentions for the actor.

11. The AV control system of claim 10, wherein processing the sensor data and the map data with the single forward pass through the machine-learned model comprises processing a fused representation of a given view of the sensor data obtained relative to the autonomous vehicle and the map data in the given view.

12. The AV control system of claim 10, wherein the detection output comprises a detection score indicative of a likelihood of the actor being in one of a plurality of predetermined classes.

13. The AV control system of claim 10, wherein the first forecasting output is represented by trajectory data comprising a sequence of bounding shapes at a plurality of time stamps.

14. The AV control system of claim 10, wherein the predefined group of possible behavior intentions for the actor comprises at least one of keep lane, turn left, turn right, left change lane, right change lane, stopped, parked, or reverse driving.

15. The AV control system of claim 10, wherein the machine-learned model comprises a plurality of shared layers that are used at least in part for determining the detection output, the first forecasting output, and the second forecasting output.

16. An autonomous vehicle, comprising:
    one or more sensors that generate sensor data relative to the autonomous vehicle;
    one or more processors; and
    one or more non-transitory computer-readable media that store instructions for execution by the one or more processors that cause the one or more processors to perform operations, the operations comprising:
       obtaining sensor data descriptive of an environment of an autonomous vehicle, the environment containing an actor;
       obtaining map data associated with the environment; and
       processing the sensor data and the map data with a single forward pass through a machine-learned model that is trained to jointly implement detection and forecasting to generate:
          a detection output descriptive of the actor in the environment;
          a first forecasting output descriptive of a trajectory indicative of an expected path of the actor towards a goal location; and
          a second forecasting output descriptive of a discrete behavior intention determined from a predefined group of possible behavior intentions for the actor.

17. The autonomous vehicle of claim 16, wherein processing the sensor data and the map data with the machine-learned model comprises processing a fused representation of a given view of the sensor data obtained relative to the autonomous vehicle and the map data in the given view.

18. The autonomous vehicle of claim 17, wherein the given view of the sensor data and the map data comprises a birds-eye view.

19. The autonomous vehicle of claim 17, wherein the given view of the sensor data is represented as a multi-dimensional tensor having at least one of a height dimension or a time dimension stacked into a channel dimension with the multi-dimensional tensor.

20. The autonomous vehicle of claim 16, the operations further comprising controlling the autonomous vehicle to execute a motion plan determined at least in part from the detection output, the first forecasting output, and the second forecasting output.

\* \* \* \* \*